United States Patent [19]
Price et al.

[11] Patent Number: 5,934,354
[45] Date of Patent: Aug. 10, 1999

[54] SECURITY SHADE SUPPORT ASSEMBLY

[75] Inventors: Jeffery Price, Lakeville; Michael Trombley, Sterling Heights; Michael Thorum, Lake Orion, all of Mich.

[73] Assignee: Irvin Automotive Products, Inc., Auburn Hills, Mich.

[21] Appl. No.: 08/956,895

[22] Filed: Oct. 23, 1997

[51] Int. Cl.[6] .................................................... B60R 5/04
[52] U.S. Cl. ................ 160/370.22; 160/313; 160/323.1; 296/37.16
[58] Field of Search ........................ 160/23.1, 24, 370.22, 160/313, 314, 318, 323.1; 296/37.16, 97.8

[56] References Cited

U.S. PATENT DOCUMENTS

| | | |
|---|---|---|
| 4,139,231 | 2/1979 | Lang et al. . |
| 4,168,094 | 9/1979 | Yagi . |
| 4,222,601 | 9/1980 | White et al. . |
| 4,479,677 | 10/1984 | Gulette et al. . |
| 4,502,674 | 3/1985 | White et al. . |
| 4,776,625 | 10/1988 | Lobanoff et al. . |
| 5,036,898 | 8/1991 | Chen ............................ 160/370.22 X |
| 5,205,332 | 4/1993 | Lii ................................. 160/370.22 X |
| 5,213,387 | 5/1993 | Decker et al. . |
| 5,224,748 | 7/1993 | Decker et al. . |
| 5,226,467 | 7/1993 | Lii ................................. 160/370.22 X |
| 5,464,052 | 11/1995 | Wieczorek et al. . |
| 5,676,415 | 10/1997 | Ament et al. . |

*Primary Examiner*—Blair M. Johnson
*Attorney, Agent, or Firm*—Dinnin & Dunn, P.C.

[57] ABSTRACT

A security shade support assembly for mounting a roller tube having a flexible panel wound thereon within a motor vehicle includes a housing extending axially, an axle extending through the housing, a bearing receiving the axle and cooperating with the housing and attached to the roller tube, and a spring disposed within the housing for biasing the bearing and a groove extending axially along the bearing and the housing to allow the roller tube and shade panel to extend over at least a portion of the housing.

13 Claims, 3 Drawing Sheets

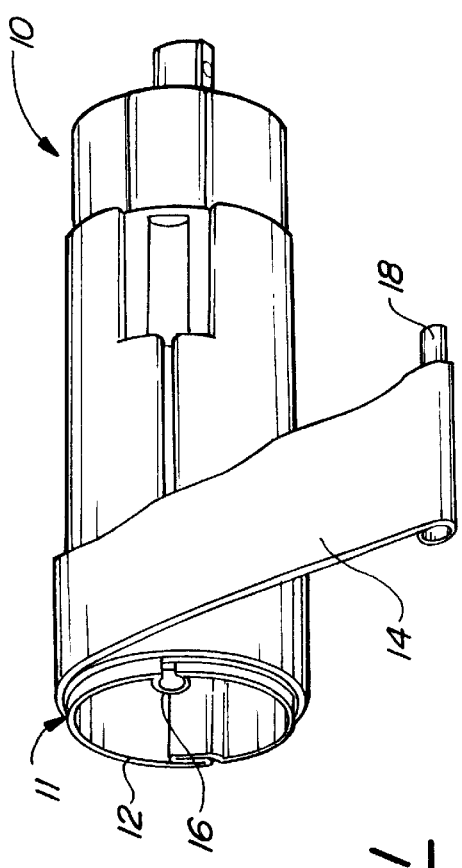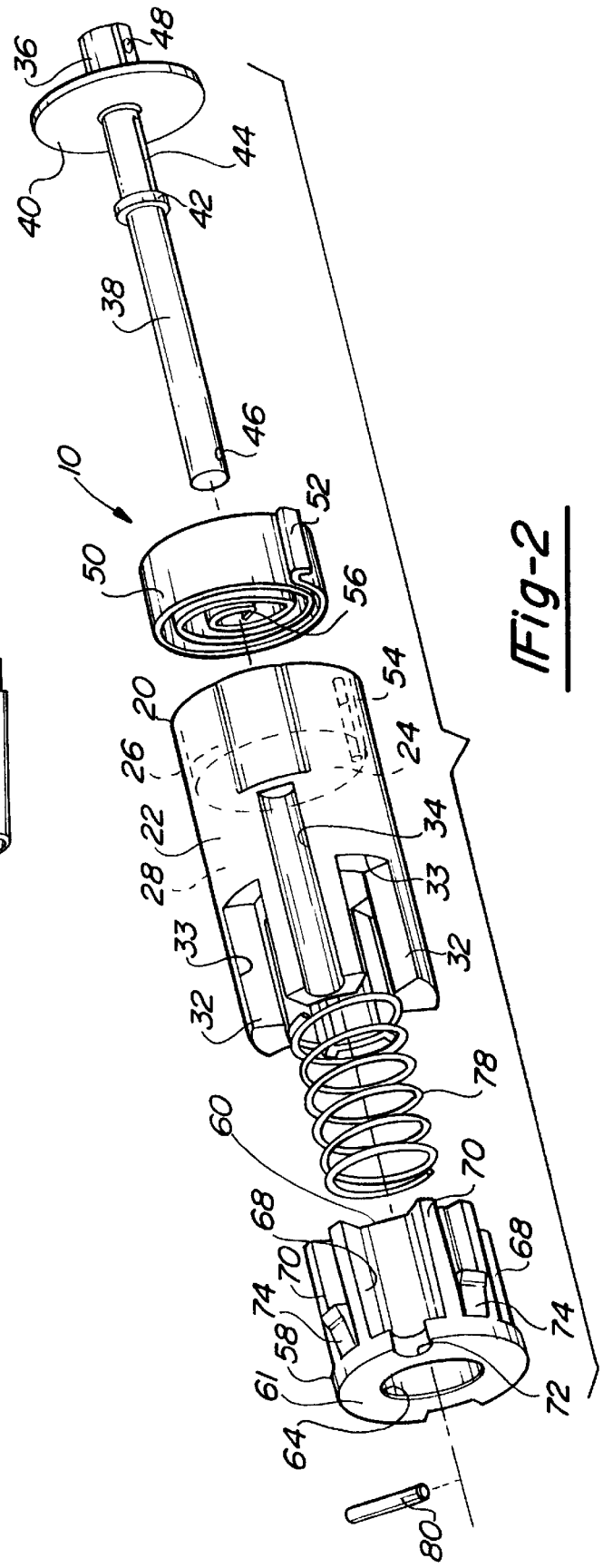

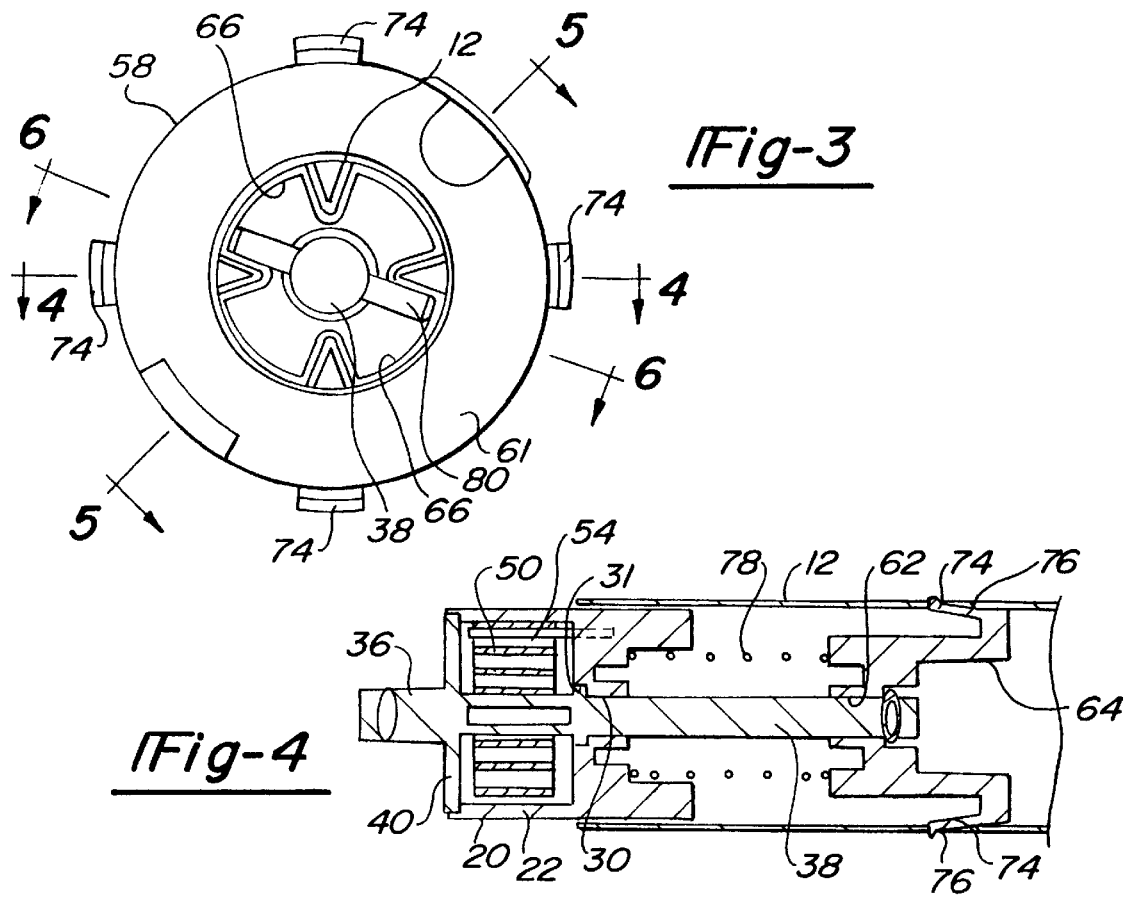
*Fig-3*
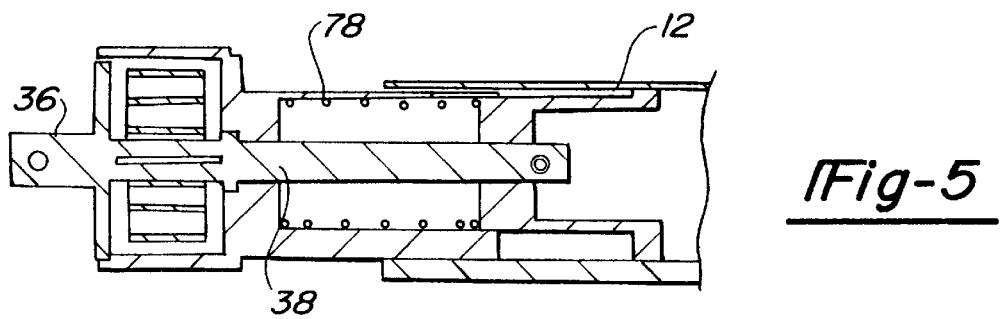
*Fig-4*
*Fig-5*
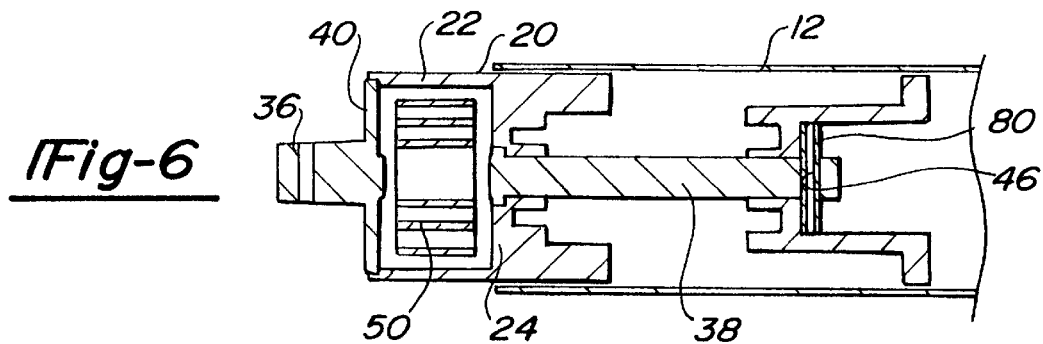
*Fig-6*

SECURITY SHADE SUPPORT ASSEMBLY

BACKGROUND OF THE INVENTION

1. Field of the Invention

The present invention relates generally to security shades for motor vehicles and, more particularly, to a support assembly for a security shade in a motor vehicle.

2. Description of the Related Art

In many motor vehicles, a rear compartment or cargo area is provided for storing cargo. Also, motor vehicle manufactures typically provide a retractable security shade or panel that can be extended to cover the cargo area and prevent anyone outside of the motor vehicle from readily viewing what is disposed in the cargo area.

An example of such a security shade is disclosed in U.S. Pat. No. 5,464,052 to Wieczorek et al. This patented security shade typically includes a roller tube and a flexible fabric panel wrapped onto the roller tube. This patented security shade also includes a support assembly mounted to the ends of the roller tube which provides for both rotational biasing of the roller tube and mounting of the security shade within the motor vehicle. The support assembly includes an extension and a skirt having a diameter greater than the extension to house a motor spring. When properly mounted, the roller tube is not completely fitted over the extension and the skirt fits outside or axially of the roller tube.

Although the above security shade has worked well, it suffers from the disadvantage that the support assembly is not compact axially. Also, the support assembly has a skirt axially outside the roller tube which results in the panel having a gap or space of approximately fifteen millimeters (15 mm) between it and a side of the cargo area.

SUMMARY OF THE INVENTION

It is, therefore, one object of the present invention to provide a new support assembly for a security shade in a motor vehicle.

It is another object of the present invention to provide a security shade support assembly that is axially compact which provides both rotational biasing and mounting of the security shade within the motor vehicle.

It is yet another object of the present invention to provide a security shade support assembly that has a spring cavity which fits into the roller tube and eliminates a gap or space between the panel and a wall of the cargo area.

To achieve the foregoing objects, the present invention is a security shade support assembly for mounting a roller tube having a flexible panel wound thereon within a motor vehicle. The security shade support assembly includes a housing extending axially, an axle extending through the housing, and a bearing receiving the axle and cooperating with the housing and attached to the roller tube. The security shade support assembly also includes a spring disposed within the housing for biasing the bearing and a groove extending axially along the bearing and the housing to allow the roller tube and shade panel to extend over at least a portion of the housing.

One advantage of the present invention is that a new security shade support assembly is provided that is shorter in axial length and is compact. Another advantage of the present invention is that the security shade support assembly provides a spring cavity that fits into the roller tube. Yet another advantage of the present invention is that the security shade support assembly eliminates a gap or space axially between the panel and a wall of the cargo area in the motor vehicle.

Other objects, features and advantages of the present invention will be readily appreciated as the same becomes better understood after reading the subsequent description taken in conjunction with the accompanying drawings.

BRIEF DESCRIPTION OF THE DRAWINGS

FIG. 1 is an elevational view of a security shade support assembly, according to the present invention, illustrated in operational relationship with a security shade.

FIG. 2 is an exploded view of the security shade support assembly of FIG. 1.

FIG. 3 is an end view of the security shade support assembly of FIG. 1.

FIG. 4 is a sectional view taken along line 4—4 of FIG. 3.

FIG. 5 is a sectional view taken along line 5—5 of FIG. 3.

FIG. 6 is a sectional view taken along line 6—6 of FIG. 3.

DESCRIPTION OF THE PREFERRED EMBODIMENT(S)

Figure 7:
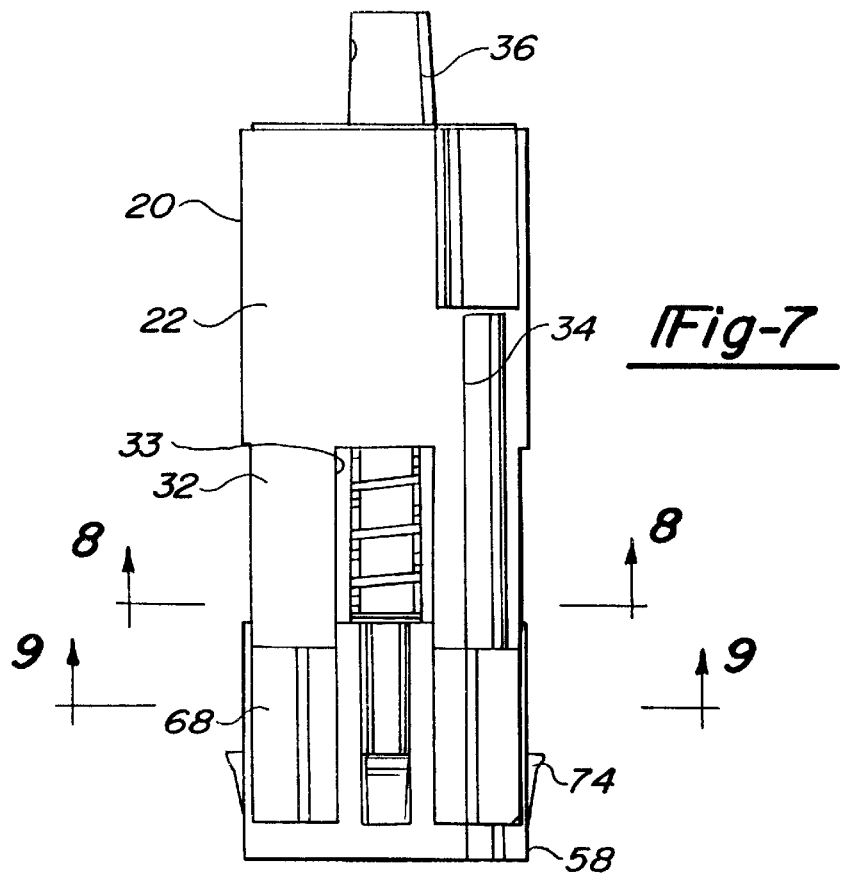
FIG. 7 is another elevational view of the security shade support assembly of FIG. 1.

Referring to FIG. 1, one embodiment of a security shade support assembly 10, according to the present invention, is illustrated in operational relationship with a security shade, generally indicated at 11. The security shade 11 includes a roller tube 12 and a shade panel 14. The security shade support assembly 10 is used to mount the roller tube 12 between side walls of a cargo area of a motor vehicle such that the shade panel 14 extends transversely between the side walls at one end of the cargo area and at a predetermined height above a support surface of the cargo area. Also, the security shade support assembly 10 is used to mount the roller tube 12 longitudinally between a seat back and a rear door of the cargo area of the motor vehicle such that the shade panel 14 extends in a direction transverse to a longitudinal axis of the motor vehicle or in a "cross-body" direction.

The roller tube 12 includes an axially extending anchor groove 16 formed therein which receives and anchors one end of the shade panel 14 thereto. A mechanism by which this end of the shade panel 14 is anchored within the anchor groove 16 may be by any methods well known in the art, including a J-clip or other fastening means inserted into the anchor groove 16 or attached to the roller tube 12.

The shade panel 14 is a flexible fabric panel wound onto the roller tube 12 and has its free end secured over a pull tube 18. As further discussed below, the security shade support assembly 10 exerts a rotational biasing force on the roller tube 12 in a direction which maintains the shade panel 14 wound on the roller tube 12. When deployed, the pull tube 18 is pulled causing the shade panel 14 to unroll from the roller tube 12. At its fully extended position, clips or fasteners (not shown) at the ends of the pull tube 18 are engaged with corresponding brackets on the cargo area walls to retain the shade panel 14 in its extended position covering the cargo area. When the clips are disengaged, the rotational biasing force exerted by the security shade support assembly 10 winds the shade panel 14 back onto the roller tube 12. It should be appreciated that a cassette or thin cover (not shown) may be provided over the security shade support assembly 10 which overfits both the roller tube 12 and the shade panel 14. It should be appreciated that a further description is provided in U.S. Pat. No. 5,464,052, the disclosure of which is hereby incorporated by reference.

Figure 8:
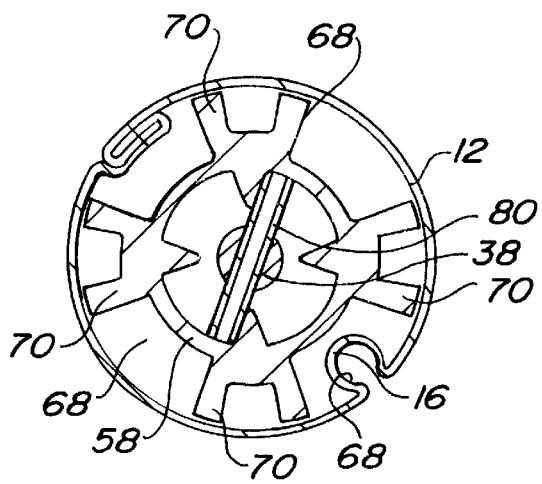
FIG. 8 is a sectional view taken along line 8—8 of FIG. 1.
Figure 9:
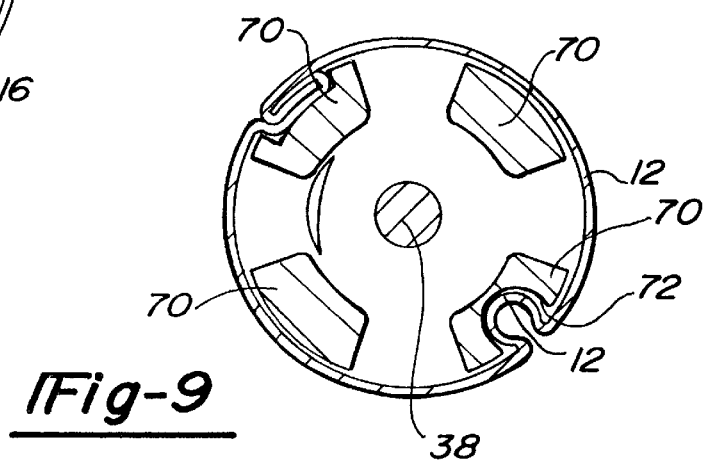
FIG. 9 is a sectional view taken along line 9—9 of FIG. 1.

Referring to FIGS. 2 through 9, the security shade support assembly 10, according to the present invention, is shown. The security shade support assembly 10 includes a housing 20 extending axially. The housing 20 has an outer wall 22 extending circumferentially and axially to form a hollow tube. Preferably, the housing 20 has a circular cross-sectional shape. The housing 20 also has an interior wall 24 disposed within the outer wall 22 and spaced between the axial ends thereof and extending radially to divide the hollow interior into a first spring cavity 26 and a second spring cavity 28. The interior wall 24 has an aperture 30 extending axially therethrough and a counterbore 31 at one end for a function to be described.

The housing 20 also includes at least one, preferably a plurality of fingers 32 extending axially from one axial end of the housing 20. In a preferred example, four (4) fingers 32 extend axially and are spaced circumferentially by a space or slot 33 extending axially and circumferentially between an adjacent pair of fingers 32 for a function to be described. The fingers 32 are integral with the outer wall 22 and formed as one-piece and unitary.

The housing 20 includes a tube groove 34 extending axially along one of the fingers 32 and at least a portion of the outer wall 22 for a function to be described. The housing 20 is made of a rigid material, preferably a plastic material. The housing 20 and fingers 32 have a combined axial length substantially equal to a predetermined length such as twice the diameter of the housing 20. It should be appreciated that the tube groove 34 may extend axially along the entire length of the outer wall 22.

The security shade support assembly 10 also includes an axle 36 extending axially through the housing 20. The axle 36 has a shaft 38 which is generally cylindrical in shape and preferably has a circular cross-sectional shape. The axle 36 includes a wall 40 extending radially from the shaft 38. Preferably, the wall 40 is generally circular in shape. The wall 40 has a diameter substantially equal to the diameter of the housing 20 to close the axial end and first spring cavity 26 of the housing 20. The axle 36 also includes a stop 42 spaced axially from the wall 40. The stop 42 extends radially from the shaft 38 and is generally circular in shape. The stop 42 has a diameter greater than the shaft 38 and fits within the counterbore 31 of the aperture 30. The axle 36 has a slot 44 extending diametrically therethrough. The slot 44 extends axially between the wall 40 and stop 42 for a function to be described. The axle 36 also includes an aperture 46 extending diametrically through the shaft 38 near one end thereof. The shaft 38 and wall 40 are integral, one-piece and unitary. The axle 36 is made of a rigid material, preferably a plastic material. It should be appreciated that one end 48 of the axle 36 is mounted in a structure (not shown) which is, in turn, removably mounted to the wall of the cargo area.

The security shade support assembly 10 includes a motor spring 50 mounted in the first spring cavity 26 of the housing 20 to provide a rotational force to the roller tube 12. To achieve this, one end 52 of the motor spring 50 is fixedly or rigidly attached to the housing 20 by a projection or pin 54 extending axially from the interior wall 24. The opposing or movable end 56 of the motor spring 50 is disposed through the slot 44 and attached to the shaft 38 of the axle 36 that couples and transfers rotation from the security shade support assembly 10 to the roller tube 12. It should be appreciated that the pin 54 and interior wall 24 are integral. It should also be appreciated that the motor spring 50 is a torsion spring (in the shape of a generally planar spiral) having its radial outer end as its fixed end and its radially inner end as its rotatable end.

The security shade support assembly 10 includes a bearing 58 attached to the roller tube 12. The bearing 58 is generally cylindrical in shape and extends axially. Preferably, the bearing 58 has a circular cross-section shape. The bearing 58 has generally planar end walls 60 and 61 at its axial ends with an aperture 62 extending axially therethrough to receive the shaft 38 of the axle 36. The bearing 58 includes a cavity 64 extending axially into the bearing 58 from the other axial end. The cavity 64 includes at least one pair of opposed recesses 66, preferably two pair forming a clover arrangement for a function to be described. The bearing 58 also includes a plurality of slots 68 extending axially from one end 60 and spaced circumferentially thereabout to form a plurality of fingers 70. The slots 68 have a circumferential width approximately equal to the circumferential width of the fingers 32 of the housing 20 and are received in the slots 33 therein for sliding mating engagement. The bearing 58 also includes a tube groove 72 extending axially to allow the anchor groove 16 of the roller tube 12 to be received therein and extend into the tube groove 34 of the housing 20. The bearing 58 also has at least one, preferably a plurality of tabs 74 which are flexible and engage a plurality of corresponding apertures 76 in the roller tube 12. The bearing 58 is made of a rigid material, preferably a plastic material. It should be appreciated that the tube grooves 72 and 34 allow the roll tube 12 to extend over at least a portion of or the entire length of the housing 20.

The security shade support assembly 10 also includes a coil spring 78 such as a compression spring disposed within the second spring cavity 28 about the shaft 38 of the axle 36 and axially between the interior wall 24 of the housing 20 and the end wall 60 of the bearing 58. The coil spring 78 allows the security shade support assembly 10 to be easily engaged/disengaged with a bracket (not shown) on the motor vehicle promoting insertion and removal of the security shade 11 from the motor vehicle.

The security shade support assembly 10 includes a clutch pin 80 extending through the aperture 46 in the shaft 38. The clutch pin 80 is generally cylindrical in shape and is disposed in the pair of opposed recesses 66 of the bearing 58 and, in this manner, locks out and prevents the bearing 58 from rotating under the influence of the motor spring 50 after an initial pre-wind. It should be appreciated that the security shade support assembly 10 can maintain its pre-wind until the security shade support assembly 10 is further assembled with the roller tube 12 to form the final construction of the security shade 11. It should also be appreciated that the clutch pin 80 engages the bearing 58 when the security shade 11 is out of the motor vehicle and eliminates the possibility of the security shade support assembly 10 of losing any pre-wind.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A security shade support assembly for mounting a roller tube having a flexible panel wound thereon within a motor vehicle comprising:

a housing extending axially;

an axle extending axially through said housing;

a bearing receiving said axle and cooperating with said housing, said bearing further including a pair of opposed recesses;

a first spring disposed within said housing for rotationally biasing said axle;

a groove extending axially along said bearing and said housing to allow a portion of the roller tube to be disposed in said groove and mounted to said security shade support assembly and allow the shade panel to extend over at least a portion of said housing; and a clutch pin extending through said axle and disposed in said recesses for maintaining said security shade support assembly in a fully assembled condition.

2. A security shade support assembly for mounting a roller tube having a flexible panel wound thereon within a motor vehicle comprising:

a housing extending axially and including a tubular outer wall and an interior wall dividing an interior thereof into a first spring cavity and a second spring cavity;

an axle extending axially through said housing;

a bearing receiving said axle and cooperating with said housing;

a first spring for rotationally biasing said axle disposed in said first spring cavity;

a second spring disposed in said second spring cavity, said second spring comprising a coil spring disposed over said axle between said bearing and a portion of said housing to allow axial compressibility therebetween; and a groove extending axially along said bearing and said housing to allow a portion of the roller tube to be disposed in said groove and mounted to said security shade support assembly and allow the shade panel to extend over at least a portion of said housing.

3. A security shade support assembly as set forth in claim 2 wherein said interior wall is spaced between axial ends of said housing and has an aperture extending therethrough to allow said axle to pass through said interior wall.

4. A security shade support assembly for mounting a roller tube having a flexible panel wound thereon within a motor vehicle comprising:

a housing extending axially and including a plurality of spaced first fingers extending axially from said housing;

an axle extending axially through said housing;

a bearing receiving said axle and cooperating with said housing, said bearing including a pair of opposed recesses and a plurality of spaced second fingers extending axially and disposed between said first fingers for sliding mating engagement therebetween;

a first spring disposed within said housing for rotationally biasing said axle;

a groove extending axially along said bearing and said housing to allow a portion of the roller tube to be disposed in said groove and mounted to said security shade support assembly and allow the shade panel to extend over at least a portion of said housing;

a clutch pin extending through said axle and disposed in said recesses for maintaining said security shade support assembly in a fully assembled condition.

5. A security shade for a cargo area of a motor vehicle to obstruct viewing into the cargo area comprising:

a roller tube having ends;

a flexible shade panel having a fixed edge and a free edge, said fixed edge being affixed to said roller tube;

a support assembly mounted to at least one of said ends of said roller tube and adapted to engage a portion of the motor vehicle to support said security shade therein;

said support assembly comprising:

a housing extending axially;

an axle extending axially through said housing;

a bearing receiving said axle and cooperating with said housing; and a first spring disposed within said housing for rotationally biasing said axle; and a groove extending axially along said bearing and said housing to allow said roller tube to be mounted to said support assembly and allow said shade panel to extend over at least a portion of said housing.

6. A security shade as set forth in claim 5 including a second spring wherein said second spring is a coil spring disposed over said axle between said bearing and a portion of said housing to allow axial compressibility therebetween.

7. A security shade as set forth in claim 5 wherein said housing includes a tubular outer wall and an interior wall dividing an interior thereof into a first spring cavity and a second spring cavity, said first spring being disposed in said first spring cavity and said second spring being disposed in said second spring cavity.

8. A security shade as set forth in claim 7 wherein said interior wall is spaced between axial ends of said housing and has an aperture extending therethrough to allow said axle to pass through said interior wall.

9. A security shade as set forth in claim 7 wherein said first spring is a torsion spring having a fixed end and a movable end, said fixed end being secured to a portion of said housing so as to be non-movable with respect thereto, said movable end being secured to a portion of said axle and being generally movable with respect to said housing.

10. A security shade as set forth in claim 5 wherein said housing includes a plurality of first fingers extending axially from an axial end of said housing and being spaced circumferentially thereabout.

11. A security shade as set forth in claim 10 wherein said bearing includes a plurality of second fingers extending axially from an axial end of said bearing and being disposed between said first fingers for sliding mating engagement therebetween.

12. A security shade as set forth in claim 5 including a clutch pin extending through said axle and cooperating with said bearing for maintaining said support assembly in a fully assembled condition.

13. A security shade support assembly for a roller tube having a flexible panel wound thereon within a motor vehicle comprising:

a housing extending axially, said housing including a tubular outer wall and an interior wall dividing an interior thereof into a first spring cavity and a second spring cavity;

an axle extending axially through said housing;

a bearing receiving said axle and cooperating with said housing;

a coil spring disposed within said second spring cavity of said housing for allowing axial compression between said bearing and said housing;

a groove extending axially along said bearing and said housing to allow the roller tube to be mounted to said security shade support assembly and allow the shade panel to extend over at least a portion of said housing;

a torsion spring disposed in said first spring cavity having a fixed end and a movable end, said fixed end being secured to a portion of said housing so as to be non-movable with respect thereto, said movable end being secured to a portion of said axle and being generally movable with respect to said housing;

an interior wall spaced between axial ends of said housing and having an aperture extending therethrough to allow said axle to pass through said interior wall;

said housing and said bearing including a plurality of fingers extending axially and being disposed circumferentially thereabout for sliding mating engagement;

said bearing including a pair of opposed recesses; and a clutch pin extending through said axle and disposed in said recesses for maintaining said support assembly in a fully assembled condition.

* * * * *